G. K. CAVINESS.
REPAIR CLAMP FOR AUTOMOBILE RUNNING BOARD TRUSS RODS.
APPLICATION FILED JAN. 2, 1920.
1,350,253. Patented Aug. 17, 1920.
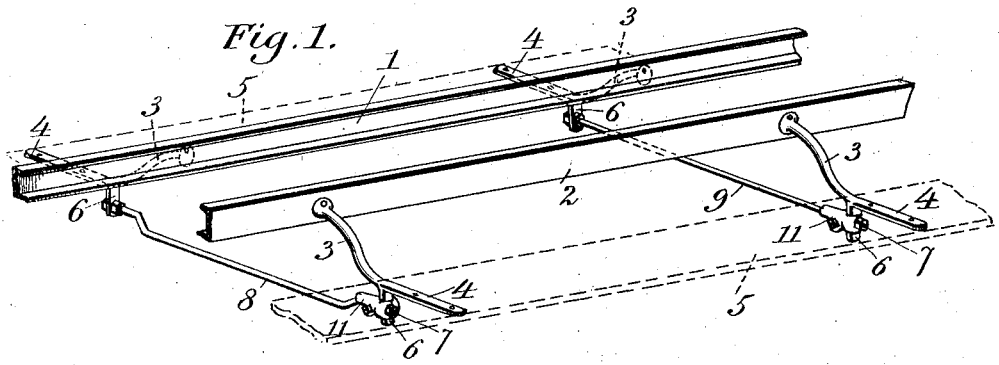
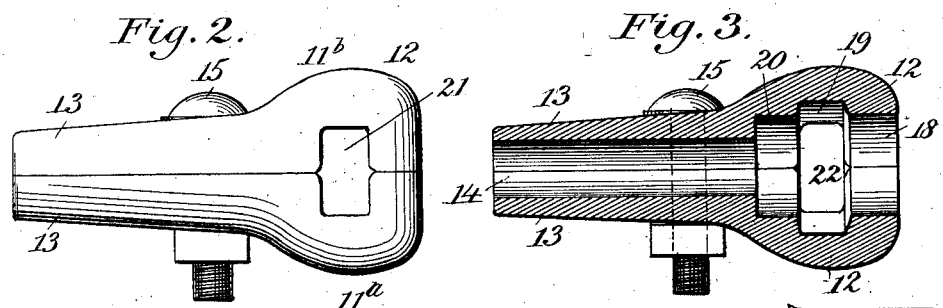
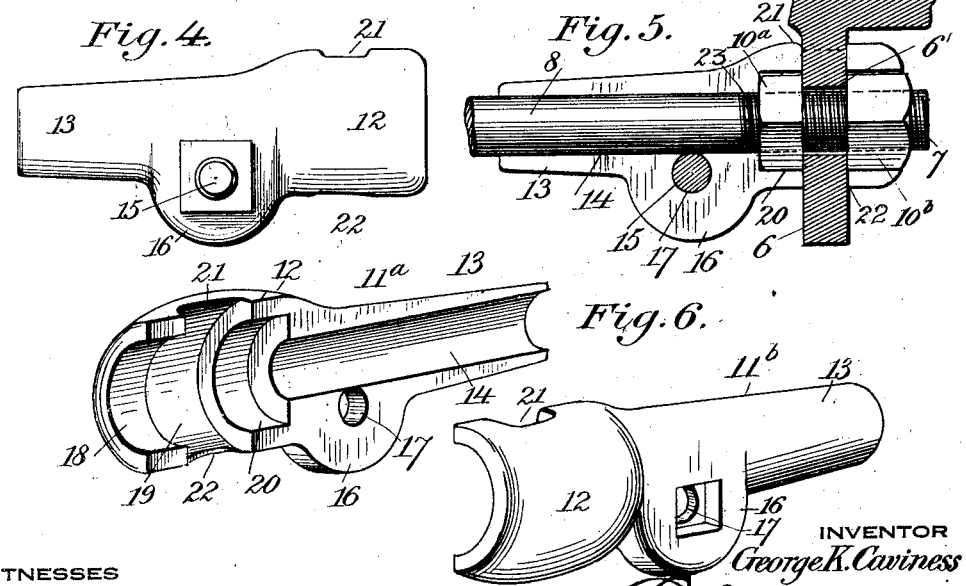
WITNESSES
Charles H. Ourand
F. T. Chapman.
INVENTOR
George K. Caviness
BY
E. G. Siggers
ATTORNEY

UNITED STATES PATENT OFFICE.

GEORGE K. CAVINESS, OF SEYMOUR, IOWA.

REPAIR-CLAMP FOR AUTOMOBILE-RUNNING-BOARD TRUSS-RODS.

1,350,253.  Specification of Letters Patent.  Patented Aug. 17, 1920.

Application filed January 2, 1920. Serial No. 348,948.

*To all whom it may concern:*

Be it known that I, GEORGE K. CAVINESS, a citizen of the United States, residing at Seymour, in the county of Wayne and State of Iowa, have invented a new and useful Repair-Clamp for Automobile-Running-Board Truss-Rods, of which the following is a specification.

This invention has reference to repair clamps for automobile running board truss rods, and its object is to provide a clamp by means of which a broken truss rod may be readily repaired and restored, so far as strength is concerned, to its original condition with the broken portion even stronger than it was originally.

In accordance with the invention, there is provided a two-part clamp with the two parts in the main duplicates. The clamp is divided longitudinally into two parts and is shaped to grip the end portion of a truss rod and receive transversely the truss rod provided on the running board bracket so that when the clamp is applied the truss rod and running board bracket are firmly joined.

The clamp is particularly designed for use in connection with the automobile known commercially as the Ford automobile. In such an automobile, the running boards are supported upon brackets made fast to the side bars or members of the chassis frame. The truss rods are liable to breakage, especially where passing through the bracket lugs, the outer or lock nut of the rod snapping off, or both nuts snapping off, and then the bracing effect of the truss rod upon the running board is lost. Of course, a new truss rod may replace the broken truss rod, but replacement is a difficult job, since the lug portions of the brackets on the opposite sides of the vehicle must be spread apart sufficiently to permit the introduction of the ends of the truss rod in the opposite lugs, this meaning that the running board brackets where carrying the running boards must be sprung sufficiently but not enough to cause permanent set.

With the invention, a broken truss rod need not be removed, for the broken end may be readily housed in the clamp, which latter will grip the adjacent end of the broken rod, the nuts at the ends of the rod, and will receive the lug originally traversed and which may still be traversed by the threaded end of the rod. In this manner, the break is reinforced, the broken end of the truss rod is held in proper relation to the running board bracket to which it is adjacent, and the truss rod is alined with the opposite bracket. By making the repair clamp of some suitable material like malleable iron, the original strength of the truss rod is restored, or even increased, while the cost of a new truss rod and the labor of installing the rod is avoided.

The invention will be best understood from a consideration of the following detailed description taken in connection with the accompanying drawings forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings,

Figure 1 is a perspective view of a small portion of a chassis frame, showing installed running board brackets, the running boards in dotted lines, and clamps embodying the invention applied to the truss rods.

Fig. 2 is a plan view of one of the clamps assembled and drawn on a larger scale than Fig. 1.

Fig. 3 is a central longitudinal section of the structure shown in Fig. 2.

Fig. 4 is a side elevation of the structure shown in Fig. 2 but viewed at right angles to the showing of Fig. 2.

Fig. 5 is a longitudinal section in the plane of division of the repair clamp, showing the end of a broken truss rod in place in the clamp.

Fig. 6 is a perspective view, showing the two members of the clamp in separated relation.

Referring to the drawing, there is shown portions of side bars 1, 2 of a chassis frame of a Ford type of automobile. Secured to the side bars 1 and 2, and projecting outwardly therefrom, are running board brackets 3, each having an arm 4 at the outer end, to which is secured an appropriate portion of a running board 5, the latter being indicated in dotted lines in Fig. 1. Each bracket 3, adjacent to the inner edge of the running board support, is provided with a depending lug 6, through which there is formed an eye or passage 6'. The lugs 6 on opposite sides of the chassis, have the passages 6' in substantial alinement, and these passages are traversed by screw-threaded ends 7 of truss rods 8 or 9, as the case may be. Each truss rod has applied to the threaded end a nut 10 to engage the inner face of a corresponding lug 6, and another nut 11 is applied to the threaded end 7 in position to engage the outer face of the same lug. In this manner, each end of the truss-rod may be clamped tightly to a corresponding bracket 3, so that the running boards on opposite sides of the vehicle are braced and held in firm position and amply resist any weight which may be ordinarily placed upon the running boards.

In order to repair a truss rod should a break occur, there is provided a clamp 11 comprising two substantially identical members 11ª and 11ᵇ. These two members are in the main alike and a description of one will apply to the other. Each clamp member comprises an expanded head portion 12 with an extended neck portion 13 leading from the head portion 12 and tapering as it recedes from said head portion 12. The neck portion forming half the neck of the complete clamp, has a longitudinal bore 14, which, together with the bore of the other clamp portion, will receive the rod 8 or 9, as the case may be, the diameter of the bore being sufficiently less than the diameter of the rod to permit the rod to be tightly clamped by the two clamp members 11ª and 11ᵇ, when forced together by a bolt 15 traversing matching ears 16 located at about the junction of the head and neck portions of the clamp members and projecting to one side thereof. The bolt is passed through matching openings 17 in the two ears when brought in face to face relation, with the opening 17 close to the bore 14, whereby the pressure exerted by the bolt is distributed quite evenly throughout the clamp where engaging the truss rod. Within each half of the head 12 are three recesses 18, 19 and 20, respectively, which recesses are shown as of semi-circular shape, although such particular shape is not obligatory. The intermediate recess 19 is of somewhat greater diameter than the end recesses 18 and 20, and matching passages 21 and 22 are provided on opposite sides of the recess 19. The construction is such that when the two halves of the clamp are placed together, the neck 13 will receive the body of the rod 8 or 9, as the case may be, up to the break, indicated at 23 in Fig. 5, while the threaded end 7 of the rod, together with the nuts 10 thereon located on opposite sides of the lug 5, will be lodged in the recesses 18 and 20 with the lug 5 passing through the openings 21 and 22 and located in the recess 19.

The break in the truss rod usually occurs either between the nuts 10, or between the rear nut 10 and the body of the truss rod where the screw threads occur, such portions of the rod representing the weakest portions thereof. Under such circumstances, the broken end of the rod will drop so far as the good end of the rod will permit and the usefulness of the rod ceases.

What is claimed is:

1. The combination with a running board truss rod and supporting bracket, of a repair clamp for the truss rod comprising a neck portion and a head portion and divided longitudinally to embrace the truss rod, the truss-receiving lug of the bracket and the lock nuts on the truss rod, the repair clamp having matching means for the reception of a clamp bolt to hold the clamp in housing relation to the nut end of the truss rod and the body of the truss rod on opposite sides of a break in the truss rod.

2. The combination with an automobile running board truss rod and supporting bracket, of a repair clamp having a neck portion and a head portion with the neck portion provided with a longitudinal passage of a size to tightly grip the body of the truss rod and the head portion laterally expanded and provided with longitudinally-arranged recesses each of a size and suitably disposed to pass the truss-rod-receiving lug of the bracket and house the lock nuts of the truss rod on opposite sides of the lug, said clamp being split longitudinally into two similar parts with matching lugs to be traversed by a clamp bolt, the length of the repair clamp being such as to extend on opposite sides of the usual point of breakage of the truss rod.

3. A repair clamp for automobile running board truss rods to join a broken-off end portion to the main portion of the truss rod, comprising a neck portion for housing the truss rod, a head portion with end recesses and an intermediate recess with the intermediate recess having opposite passages to be traversed by the truss rod lug of the running board bracket and the side recesses being of a size to house the truss rod lock nuts, said clamp being divided longitudinally into two like parts and said parts having matching lugs with matching holes therethrough to receive a clamp bolt whereby when the clamp is applied to a broken truss rod with the parts associated in working position, the clamp will hold the broken parts in working position and avoid the necessity of installing a new truss rod.

In testimony that I claim the foregoing as my own I have hereto affixed my signature in the presence of two witnesses.

GEORGE K. CAVINESS.

Witnesses:
B. F. WHARTAN,
J. I. INWAN.